US008310692B2

(12) United States Patent
Saito

(10) Patent No.: US 8,310,692 B2
(45) Date of Patent: Nov. 13, 2012

(54) IMAGE PROCESSING APPARATUS, IMAGE PROCESSING METHOD, COMPUTER-READABLE MEDIUM AND COMPUTER DATA SIGNAL

(75) Inventor: Teruka Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 674 days.

(21) Appl. No.: 12/402,130

(22) Filed: Mar. 11, 2009

(65) Prior Publication Data

US 2010/0007912 A1 Jan. 14, 2010

(30) Foreign Application Priority Data

Jul. 10, 2008 (JP) ................. 2008-180107

(51) Int. Cl.
*H04N 1/40* (2006.01)
*G06K 15/00* (2006.01)

(52) U.S. Cl. ...... 358/1.14; 358/3.28; 358/539; 382/181; 705/57; 380/201

(58) Field of Classification Search .................. None
See application file for complete search history.

(56) References Cited

U.S. PATENT DOCUMENTS

| 5,353,130 | A | | 10/1994 | Hasegawa |
| 5,589,949 | A | * | 12/1996 | Miyaza et al. ............. 358/451 |
| 5,748,801 | A | * | 5/1998 | Goto .......................... 382/270 |
| 6,125,213 | A | | 9/2000 | Morimoto |
| 6,229,914 | B1 | * | 5/2001 | Hiraishi et al. ............. 382/162 |
| 6,470,094 | B1 | | 10/2002 | Lienhart et al. |
| 7,805,673 | B2 | | 9/2010 | Der Qualer et al. |
| 8,041,113 | B2 | | 10/2011 | Nishida |
| 2003/0007661 | A1 | | 1/2003 | Noguchi |
| 2005/0231746 | A1 | | 10/2005 | Parry et al. |
| 2006/0126098 | A1 | * | 6/2006 | Shimura et al. ............. 358/1.14 |
| 2008/0012873 | A1 | * | 1/2008 | Nishiwaki ................... 345/581 |
| 2008/0079990 | A1 | | 4/2008 | Iida |
| 2010/0007912 | A1 | * | 1/2010 | Saito .......................... 358/1.15 |

FOREIGN PATENT DOCUMENTS

| EP | 0528105 A1 | 2/1993 |
| EP | 1499102 A2 | 1/2005 |
| EP | 1670232 A2 | 6/2006 |
| JP | 5-274464 A | 10/1993 |
| JP | 05-292312 A | 11/1993 |

(Continued)

OTHER PUBLICATIONS

Japanese Office Action issued May 18, 2010 in Japanese application No. 2008-180106.

(Continued)

*Primary Examiner* — Thomas Lett
(74) *Attorney, Agent, or Firm* — Sughrue Mion, PLLC

(57) ABSTRACT

An image processing apparatus includes an image receiving unit, an extraction unit, a determination unit, an area conversion unit and an image concealing unit. The image receiving unit receives an image. The extraction unit extracts a portion having been additionally written in the image received by the image receiving unit. The determination unit determines an area to be concealed in the received image based on the additionally written portion extracted by the extraction unit. The area conversion unit converts the area determined by the determination unit. The image concealing unit conceals the area determined by the determination unit in the received image using an area obtained by the conversion of by the area conversion unit.

20 Claims, 14 Drawing Sheets

FOREIGN PATENT DOCUMENTS

| | | |
|---|---|---|
| JP | 6-121146 A | 4/1994 |
| JP | 7-203180 A | 8/1995 |
| JP | 09-062175 A | 3/1997 |
| JP | 10-91768 A | 4/1998 |
| JP | 11-025077 A | 1/1999 |
| JP | 11-120331 A | 4/1999 |
| JP | 2000-231556 A | 8/2000 |
| JP | 2001-325258 A | 11/2001 |
| JP | 2002-259363 A | 9/2002 |
| JP | 2004-118599 A | 4/2004 |
| JP | 2006-135664 A | 5/2006 |
| JP | 2007-110453 A | 4/2007 |
| JP | 2007-166341 A | 6/2007 |
| WO | 2005-022896 A1 | 3/2005 |

OTHER PUBLICATIONS

Japanese Office Action issued May 18, 2010 in corresponding Japanese application No. 2008-180107.

Japanese Office Action issued May 18, 2010 in Japanese application No. 2008-180108.

Saito, T., U.S. Appl. No. 12/359,074, filed Mar. 11, 2009.

Saito, T., U.S. Appl. No. 12/402,073, filed Mar. 11, 2009.

Australian IP Examiner's first report on patent application No. 2009200948 dated Feb. 18, 2010.

European Search Report dated Jul. 27, 2009 in application No. 09001164.4-2212.

Yu, Yi-Wei et al. "Image Segmentation Based on Region Growing and Edge Detection" Systems, Man, and Cybernetics, 1999. IEEE International Conference, Tokyo, Japan. Oct. 12-15, 1999, vol. 6, pp. 798-803. XP010363192.

Extended European Search Report for European Application No. 09001164 dated Nov. 9, 2009.

Non-Final Office Action, issued by the U.S. Patent and Trademark Office in related U.S. Appl. No. 12/402,073 on Dec. 28, 2011.

Final Office Action, issued by the U.S. Patent and Trademark Office in related U.S. Appl. No. 12/402,073 on Apr. 19, 2012.

Non-Final Office Action, issued by the U.S. Patent and Trademark Office in related U.S. Appl. No. 12/402,073 on Dec. 28, 2012.

* cited by examiner

Projection amount (Pixel amount)

Position in image

IMAGE PROCESSING APPARATUS, IMAGE PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-180107 filed on Jul. 10, 2008.

BACKGROUND

1. Technical Field

The invention relates to an image processing apparatus, an image processing method, a computer-readable medium and a computer data signal.

2. Related Art

Documents possessed by an administrative organ, etc., have been made public. However, those documents may contain information to be concealed from the viewpoint of protection of personal information, etc. Then, when those document are made to public, parts where the information to be concealed is described are filled in with black (black out).

SUMMARY

According an aspect of the invention, an image processing apparatus includes an image receiving unit, an extraction unit, a determination unit, an area conversion unit and an image concealing unit. The image receiving unit receives an image. The extraction unit extracts a portion having been additionally written in the image received by the image receiving unit. The determination unit determines an area to be concealed in the received image based on the additionally written portion extracted by the extraction unit. The area conversion unit converts the area determined by the determination unit. The image concealing unit conceals the area determined by the determination unit in the received image using an area obtained by the conversion of by the area conversion unit.

BRIEF DESCRIPTION OF THE DRAWINGS

Exemplary embodiments of the invention will be described in detail based on the following figures, wherein.

DETAILED DESCRIPTION

Now, referring to the accompanying drawings, exemplary embodiments of the invention will be described below.

Figure 1:
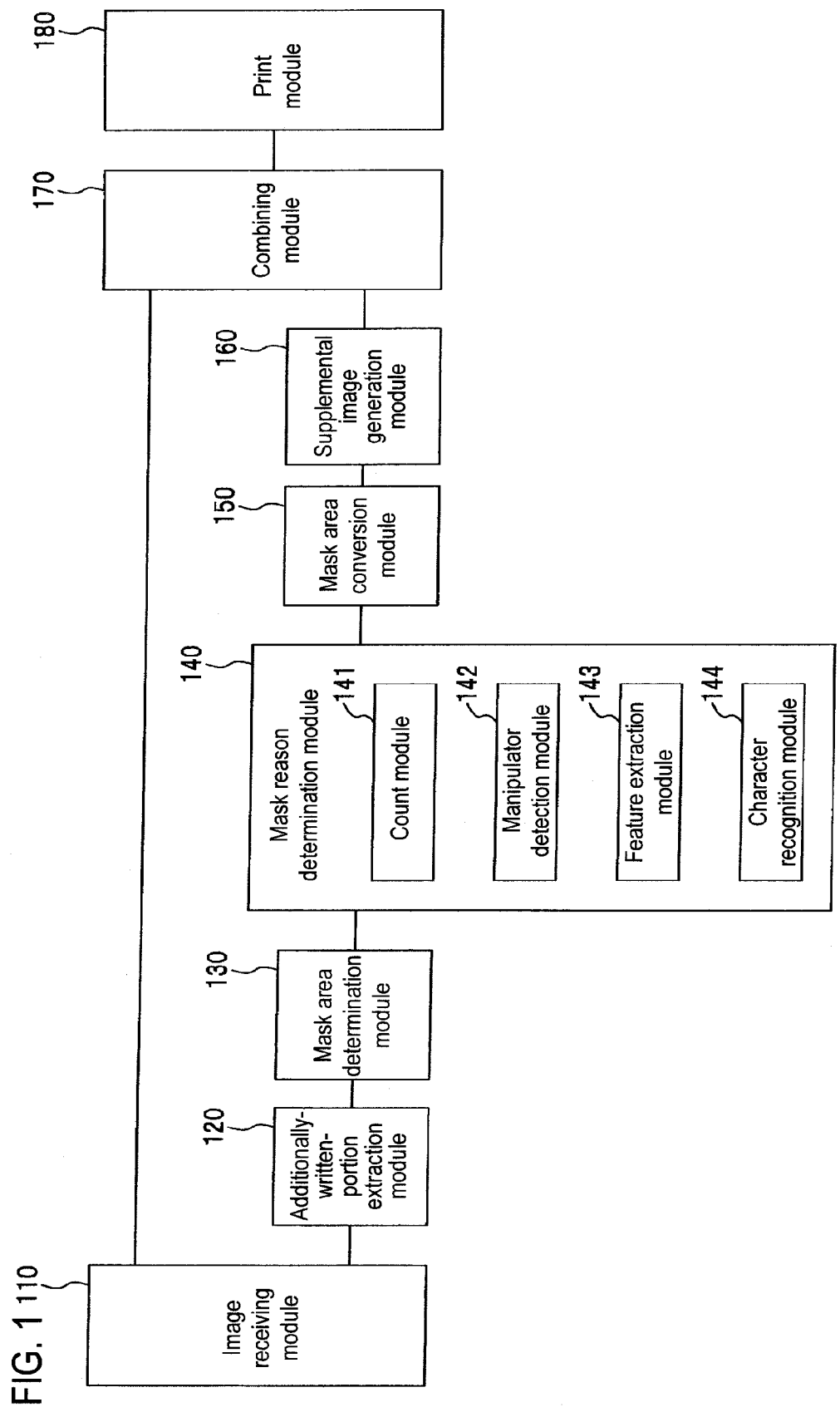
FIG. 1 is a conceptual module block diagram of a configuration example according to an exemplary embodiment of the invention.

FIG. 1 is a conceptual module block diagram of a configuration example according to an exemplary embodiment of the invention.

A "module" refers to a generally and logically detachable software component (computer program), generally and logically detachable hardware component, and the like. Therefore, the "module" in exemplary embodiments means not only a module in a computer program, but also a module in the hardware configuration. The exemplary embodiments also serve as description of a computer program, a system, and a method. For the convenience of the description, "store", "cause to store" and its equivalent words are used. If the exemplary embodiment is a computer program, these words are used to mean storing something in storage or controlling so as to store something in storage. Modules have an substantially one-to-one correspondence relation with functions. However, in implementation, one module may be constituted by one program, two or more modules may be constituted by one program, or two or more programs may make up one module. Two or more modules may be executed on one computer or one module may be executed on two or more computers in a distributed or parallel environment. One module may contain any other module. In the following description, the term "connection" is used to mean not only physical connection, but also logical connection (data transfer, command, reference relationship between data, etc.).

Also, a system or an apparatus is not only provided by connecting plural computers, hardware components, devices, etc., via a communication line such as a network (containing peer-to-peer communication connection), etc., but also implemented as one computer, hardware component, device, etc. The words "apparatus" and "system" are used as synonymous with each other. The word "predetermined" refers to a timing, a situation, a state, etc., before a target process; it is used to mean "being determined" in response to the situation, the state, etc., at that time or in response to the situation, the state, etc., so far before processing according to the exemplary embodiments is started or even after the processing according to the exemplary embodiments is started As shown in FIG. 1, this exemplary embodiment has an image receiving module 110, an additionally-written-portion extraction module 120, a mask area determination module 130, a mask reason determination module 140, a mask area conversion module 150, a supplemental image generation module 160, a combining module 170, and a print module 180.

The image receiving module 110 is connected to the additionally-written-portion extraction module 120 and the combining module 170. The image receiving model receives a target image and passes the image (hereinafter, may be refereed to as an "original image") to the additionally-written-portion extraction module 120 and the combining module 170. The expression "receiving an image" contains reading an image with a scanner, receiving an image by a facsimile machine, reading an image from an image database, etc., and the like. The target image is a document to be made to public, and additional writing is made in a portion to be concealed. The number of images may be one or may be two or more. Additional writing is made with a pen having semitransparent color ink other than black, for example. It is assumed that if the ink is put on black characters, the characters can be seen. The pen may be one called a marker pen, a highlighter or the like. The portion to which additional writing is made with the marker pen, etc., is particularly referred to as a marker image. Additional writing may be made with a red ball-point pen.

The additionally-written-portion extraction module 120 is connected to the image receiving module 110 and the mask area determination module 130. The additionally-written-portion extraction module 120 receives the original image from the image receiving module 110, extracts a portion that has been additionally written to the original image, and passes the additionally written portion to the mask area determination module 130. The extraction process is performed, for example, by extracting a portion having an additionally written color, by making a comparison between the received original image and an image in which additionally writing has not been made (for example, by performing EOR logical operation therefor) to extract the additionally written portion, or the like.

The additionally-written-portion extraction module 120 may extract, using a first threshold value, a first area including at least a part of a portion having been additionally written in the image received by the image receiving module 110. Then, the additionally-written-portion extraction module 120 may calculate a second threshold value based on a feature in a third area that is arranged along with the first area, which is extracted using the first threshold value. The additionally-written-portion extraction module 120 may further extract, using a second threshold value, a second area including the portion having been additionally written in the image received by the image receiving module 110. Furthermore, in order to deal with the case where black pixels (for example, a line segment) in the image breaks additional writing (particularly, a marker image), the calculation of the second threshold value may use a pixel density and/or a line segment amount in the third area as the feature in the third area. The expression the "third area that is arranged along with the first area, which is extracted using the first threshold value," is used to mean an area surrounding the first area, which is extracted using the first threshold value. More specifically, this expression is used to mean an area adjacent to the first area, which is extracted using the first threshold value, in a character string direction (a long-side direction of a circumscribed rectangle of the extracted character string), namely, to mean an area in the back and forth direction with respect to an additionally writing direction (a line drawing direction) of the first area, which is extracted using the first threshold value. A specific example thereof will be described later with reference to FIG. 4.

The line segment amount, which is used in calculating the second threshold value, may be the number of line segments in the third area that extend in substantially parallel to a short side of the first area. That is, the line segment amount may be the number of line segments extending parallel to (an inclination of about 30 degrees is permitted) the shorter side of the longitudinal and lateral sides of the circumscribed rectangle of the first area, which include at least a part of the additionally written portion and is extracted using the first threshold value (i.e. line segments perpendicular to the long side thereof (an inclination of about ±30 degrees is permitted)). A specific example thereof will be described later with reference to FIG. 7.

The second threshold value is a value that can be used to extract a larger area than the first area, which includes at least a part of the additionally written portion and is extracted using the first threshold value. Extracting, using the second threshold value, of the second area including the additionally written portion may be performed an certain extraction process using the second threshold value for the third area, which is arranged along with the first area extracted using the first threshold value. There is a possibility that the additionally written portion may be broken and the first area, which is extracted using the first threshold value, may only include a part of the additionally written portion. Therefore, in order to extract the additionally written portion obtained by extending the first area and to reduce a processing area, the extraction process may be performed only for a portion in which the additionally written portion is possibly included.

The mask area determination module 130 is connected to the additionally-written-portion extraction module 120 and the mask reason determination module 140. The mask area determination module 130 determines an area to be concealed (which will be hereinafter also referred to as a "concealment area" or a "mask area") in the image based on the second area, which includes the additionally written portion and is extracted by the additionally-written-portion extraction module 120. Since the additionally written portion is often handwritten, it often has a non-rectangle shape and the portion to be concealed may protrude from the additionally written portion. Therefore, if the second area including the additionally written portion is concealed faithfully, a portion that is desired to be concealed may be unable to be concealed. In order to deal with this situation, the mask area determination module 130 extract rectangles circumscribing respective character image(s) or the like that are made up of black pixels in the second area including the additionally written portion and adopts an area obtained by integrating the circumscribed rectangles, as a mask area.

The mask reason determination module 140 is connected to the mask area determination module 130 and the mask area conversion module 150. The mask reason determination module 140 receives the concealment area and the second area including the additionally written portion from the mask area determination module 130, and determines a concealing reason based on information concerning manipulation of an image or a feature concerning the second area (the additionally written portion) extracted by the additionally-written-portion extraction module 120. The mask reason determination module 140 passes the concealing reason and the concealment area to the mask area conversion module 150. The mask reason determination module 140 has a count module 141, a manipulator detection module 142, a feature extraction module 143, and a character recognition module 144. The mask reason determination module 140 determines a concealing reason using any one or combination of the detection results of the above modules.

Examples of the concealing (non-disclosing) reason are as follows:
(1) Information that can identify a specific person (personal information)
(2) Information that impairs legitimate interests of a corporation (corporate information)
(3) Information that impairs safety of country, trust relationship with foreign countries, etc., (national security information)
(4) Information that has impact on public security and order (public security information)
(5) Information that relates to deliberation, discussion, etc. and possibly unjustifiedly impairs neutrality of decision making or possibly unjustifiedly causes disorder among people (deliberation/discussion information)
(6) Information that has impact on proper execution of work and business of an administrative organ, an independent administrative agency, etc., (work business information)

Also, information concerning the concealing reason may include a concealing reason or a concealing person (a person who makes additional writing, a person in charge who instruct the concealment or a department name).

The count module 141 and the manipulator detection module 142 may use information responsive to manipulator's manipulation or information that identifies a manipulator as the information concerning image manipulation. More specifically, different information are used as the information responsive to manipulator's manipulation, for a manipulation of specifying a reason when the manipulator uses this exemplary embodiment and for a manipulation of preparing, for each reason, plural copies of a document in which additional writing has been made and associating the reason with the number of times the exemplary embodiment is used (for example, associating a "reason 1" with the first time). When this exemplary embodiment is used, an ID (Identification Data) card of a manipulator may be read as the information, which identifies the manipulator and an manipulator ID may be extracted therefrom. A responsive person ID may be extracted from a predetermined correspondence table between manipulator IDs and responsive person IDs or the like.

The feature extraction module 143 extracts color information of the second area (the additionally written portion) as the feature concerning the second area (the additionally written portion). In addition, the feature extraction module 143 may extract a form (a line width, a line type, a size, etc.) of the second area (the additionally written portion). The character recognition module 144 recognizes each character image in the concealment area determined by the mask area determination module 130.

Figure 16A:
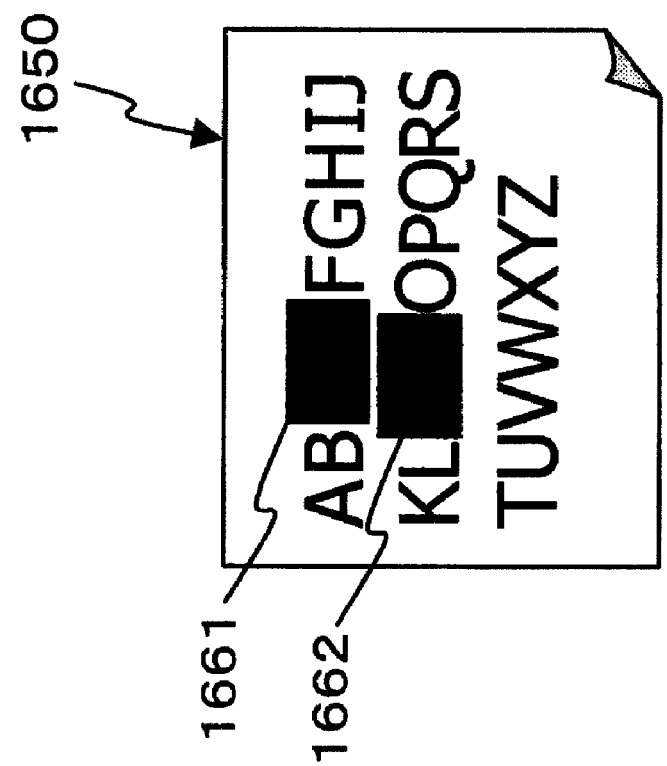
FIGS. 16A and 16B are explanatory views showing an example of an image to be processed by the mask area conversion module and an example of an image processed by the mask area conversion module.
Figure 16B:
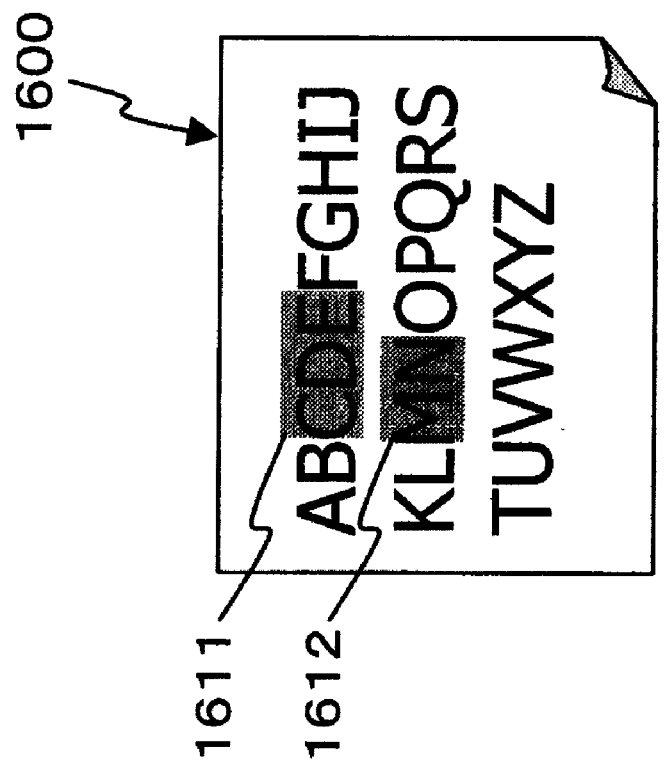

The mask area conversion module 150 is connected to the mask reason determination module 140 and the supplemental image generation module 160. The mask area conversion module 150 receives the concealing reason and the concealment area from the mask reason determination module 140, and converts the concealment area determined by the mask area determination module 130. The mask area conversion module 150 passes the concealment reason and an area obtained by the conversion to the supplemental image generation module 160. Based on sizes of plural concealment areas determined by the mask area determination module 130, the mask area conversion module 150 may convert the concealment areas. For example, the mask area conversion module 150 calculates an average value of the sizes of the concealment areas is calculated, and unifies the sizes of the concealment areas into the size of the average value. The conversion of the sizes of the concealment areas will be described later with reference to FIGS. 16A and 16B.

The supplemental image generation module 160 is connected to the mask area conversion module 150 and the combining module 170. The supplemental image generation module 160 receives the concealing reason and the concealment area or the area obtained by converting the concealment area from the mask area conversion module 150, and generates an image indicating the concealing reason (hereinafter may be referred to as a "concealing reason image" or a "supplemental image") using the concealing reason determined by the mask reason determination module 140. The supplemental image generation module 160 passes the concealment area and the concealing reason image to the combining module 170. The concealing reason image may contain an image indicating information that can identify a person who conceals (e.g., a person who makes additional writing). The supplemental image generation module 160 may set a different display form to each concealment area, in response to the size of each concealment area. For example, if the size of the concealment area is large enough to describe the concealing reason therein, the concealing reason may be displayed directly in the concealment area; otherwise, a symbol may be used instead and the meaning of the symbol may be displayed on an appendix. This determination is made by calculating a size of a display area based on the number of characters in the concealing reason and the sizes of the respective characters and comparing the size of the display area with the size of the concealment area. The supplemental image generation module 160 may vary a form (color, shape, etc.) of the concealment area depending on the concealing reason, for example, in such a manner that a reason 1 is displayed in red and a reason 2 is displayed in a circular shape. A specific example of the concealing reason image will be described later with reference to FIGS. 10A and 10B.

The combining module 170 is connected to the image receiving module 110, the supplemental image generation module 160, and the print module 180. The combining module 170 conceals the concealment area determined by the mask area determination module 130 within the original image received by the image receiving module 110 and adds the image indicating the concealing reason generated by the supplemental image generation module 160 to the original image.

The combining module 170 may add an image indicating the concealing reason in accordance with a size of a blank area in the original image. That is, if a blank area having such a size as to allow the concealing reason to be displayed therein exists in the original image, the concealing reason is displayed in the original image; if no blank area having such a size as to allow the concealing reason to be displayed therein exists in the original image, the combining module 170 adds another image like an appendix (e.g., see FIG. 10B) in which the concealing reasons are displayed (increases the number of pages). For example, the combining module 170 calculates in advance a size that allows the respective concealing reasons to be displayed. If the calculated size is larger than that of the blank area in the image or if there are plural concealing reasons to be displayed and a sum of the sizes of the plural concealing reasons is larger than the size of the blank area in the image, the combining module 170 generates another image as an appendix. The size mentioned here may be not only an area, but also longitudinal and lateral lengths that are required for display.

If the mask area conversion module 150 converts the concealment area, the combining module 170 also converts the original image in accordance with the size of the area obtained by converting the concealment area. That is, the combining module 170 converts an area(s) other than the concealment area. Also, the combining module 170 converts an area(s) other than the concealment area determined by the mask area determination module 130 so as to keep the length of each character string in the original image. Conversion of the original image will be described later with reference to FIGS. 16A and 16B.

The print module 180 is connected to the combining module 170, and outputs a composite image provided by the combining module 170 (an image to which a concealment process is performed and to which the concealing reason image is added) (for example, the print module 180 prints the image by a printer, etc.). This printed image is made to public. The outputting may be not only printing, but also displaying, transmitting to another facsimile machine through a communication line, storing in an image database, or the like.

According to another exemplary embodiment, the mask reason determination module 140, the mask area conversion module 150, and the supplemental image generation module 160 may be excluded. In this case, the mask area determination module 130 and the combining module 170 are connected. Also, according to further another exemplary embodiment, the mask reason determination module 140 and the supplemental image generation module 160 may be excluded. In this case, the mask area determination module 130 and the mask area conversion module 150 are connected, and the mask area conversion module 150 and the combining module 170 are connected. According to still another exemplary embodiment, the mask area conversion module 150 may be excluded. In this case, the mask reason determination module 140 and the supplemental image generation module 160 are connected.

Figure 2:
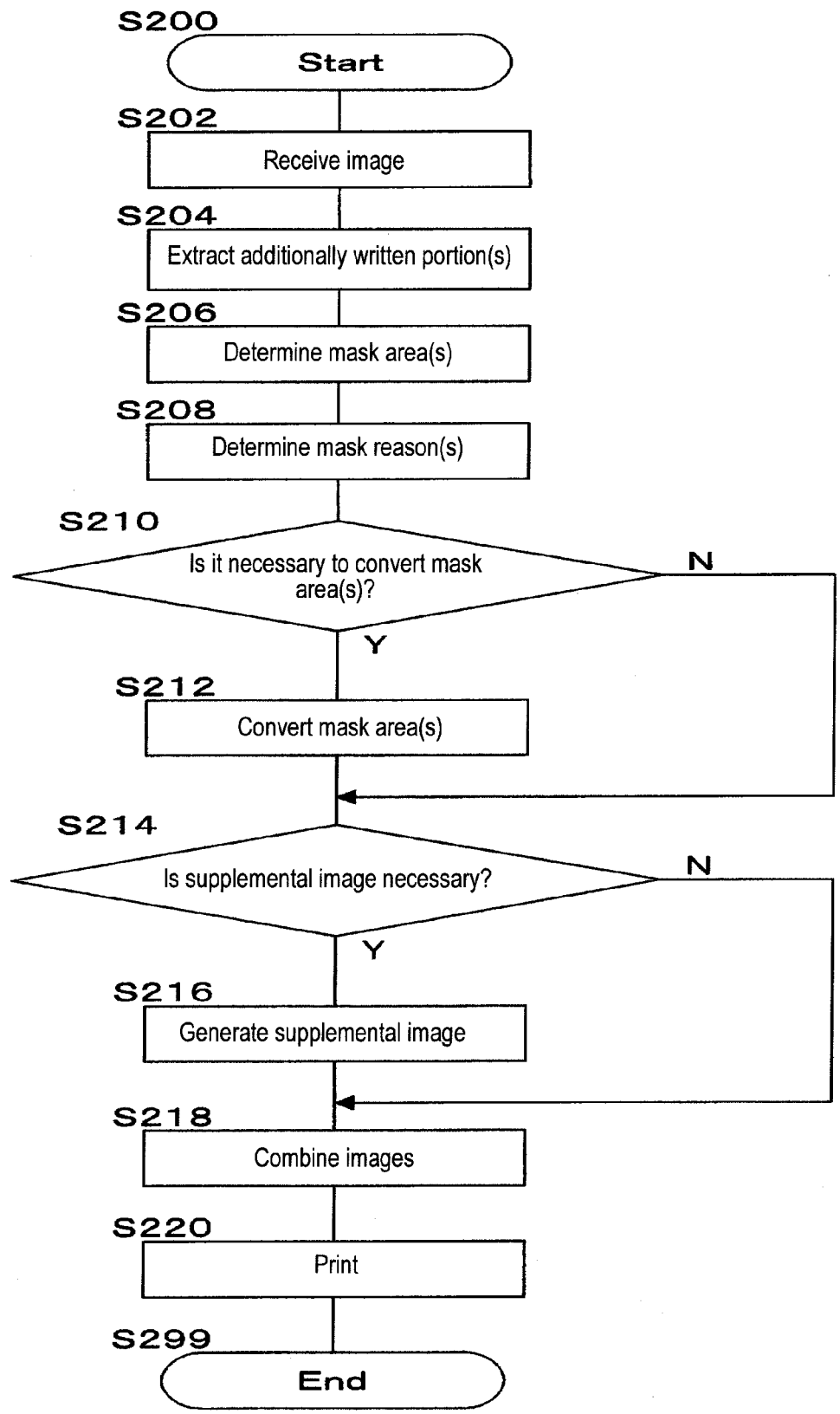
FIG. 2 is a flowchart showing a process example according to the exemplary embodiment of the invention.

FIG. 2 is a flowchart showing a process example according to the exemplary embodiment of the invention.

At step S202, the image receiving module 110 receives an image in which additional writing has been made.

At step S204, the additionally-written-portion extraction module 120 extracts the additionally written portion (e.g., a second area) from the original image. A more detailed process example will be described later with reference to FIGS. 3 and 6.

At step S206, the mask area determination module 130 determines an area to be masked based on the first area extracted at step S204.

At step S208, the mask reason determination module 140 determines a mask reason.

At step S210, the mask area conversion module 150 determines as to whether or not it is necessary to convert the mask area. If the mask area conversion module 150 determines that it is necessary to convert the mask area, the process goes to S212; otherwise, the process goes to S214. For example, if mask areas have the same size (if mask areas are within a predetermined value range, those mask area may be determined as having the same size), the mask area conversion module 150 may determine that it is not necessary to convert the mask areas. Mask areas for which this determination is made may only be mask areas contained in the same line.

At step S212, the mask area conversion module 150 converts the mask area.

At step S214, the supplemental image generation module 160 determines as to whether or not it is necessary to generate a supplemental image. If the supplemental image generation module 160 determines that it is necessary to generate a supplemental image, the process goes to S216; otherwise, the process goes to S218. For example, the determination may be made in accordance with specification by a manipulator.

At step S216, the supplemental image generation module 160 generates a supplemental image.

At step S218, the combining module 170 combines the original image received at step S202 and the mask area determined at step S206 (or the mask area provided at step S212) or the supplemental image generated at step S216.

At step S220, the print module 180 prints the composite image provided at step S218.

Figure 3:
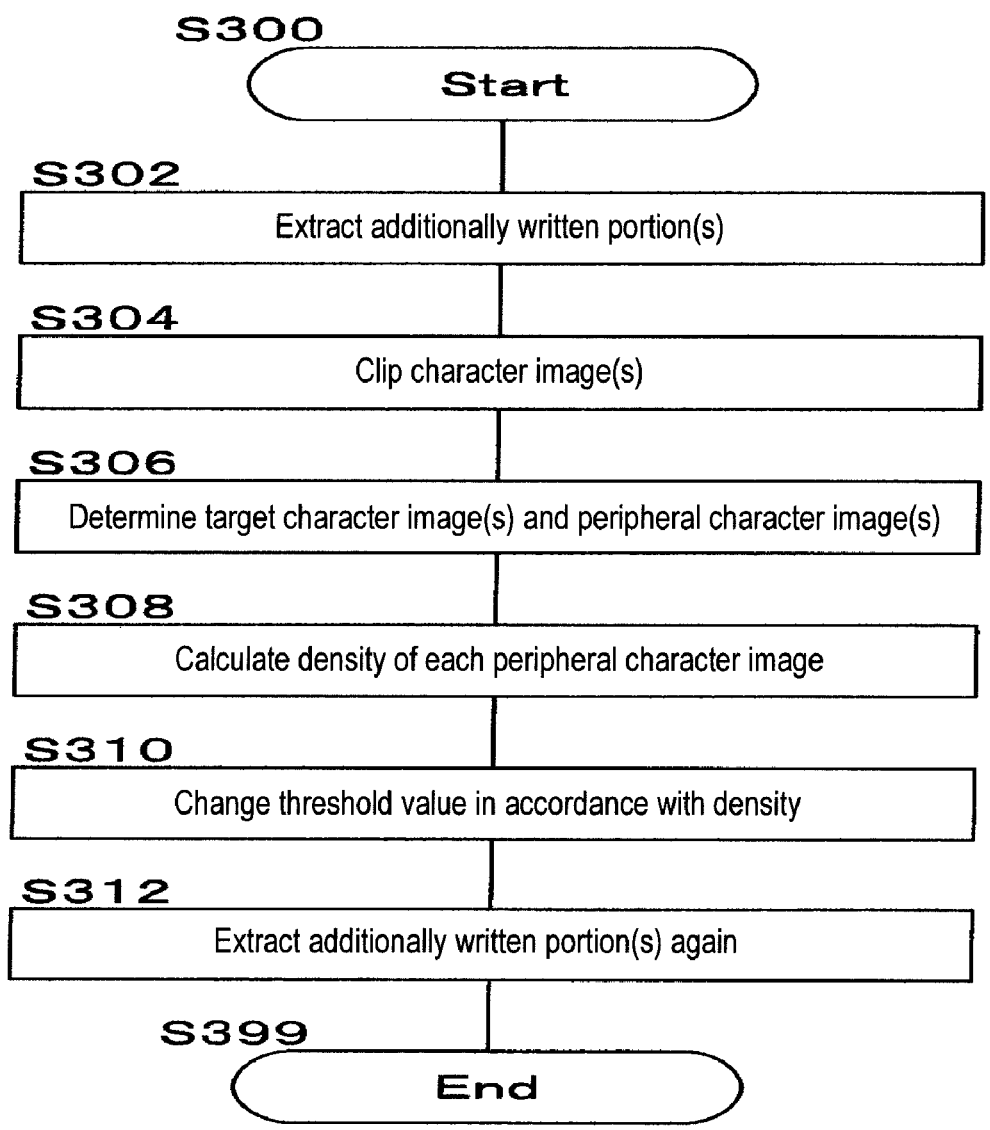
FIG. 3 is a flowchart showing a first process example of an additionally-written-portion extraction module.
Figure 6:
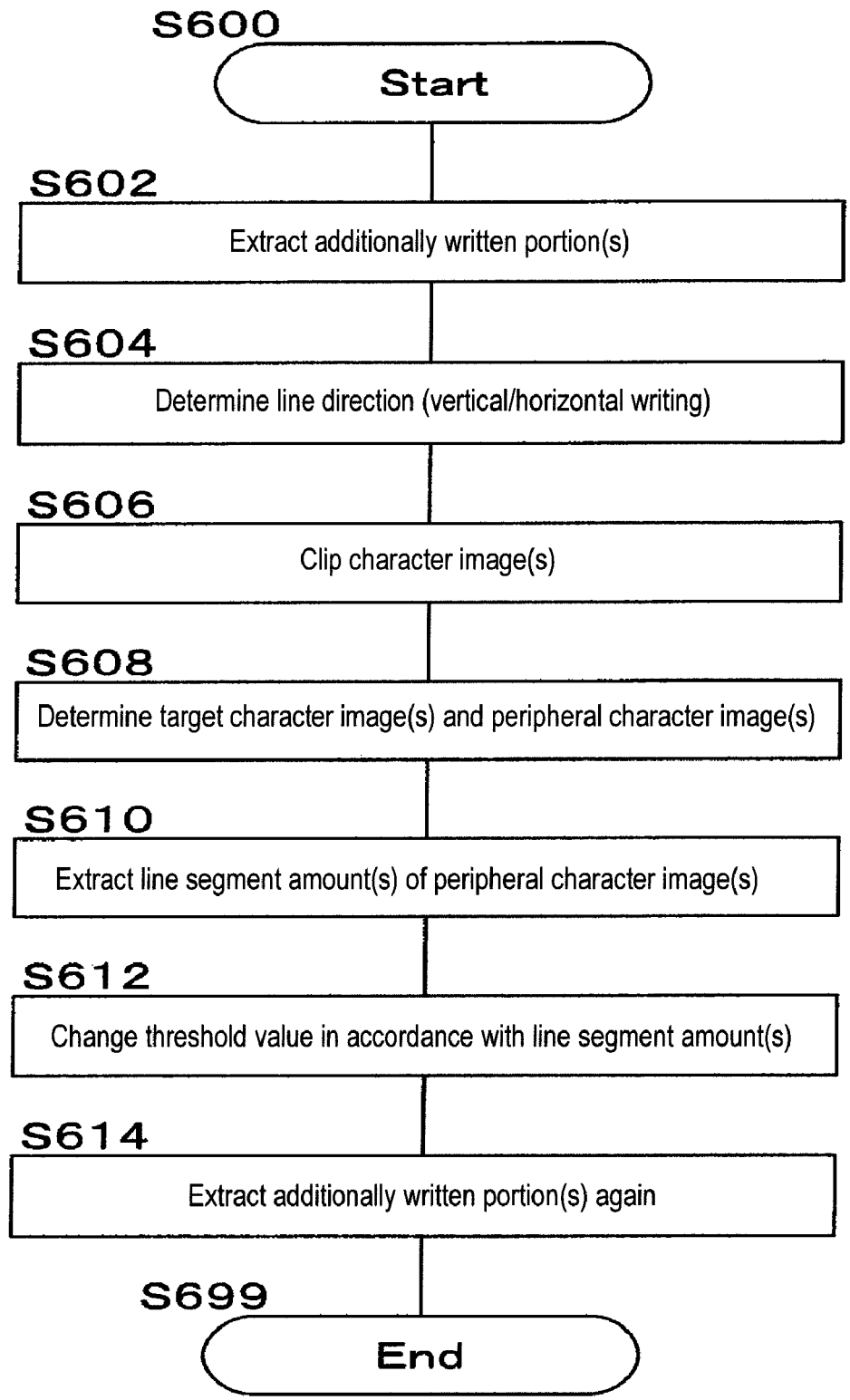
FIG. 6 is a flowchart showing a second process example of the additionally-written-portion extraction module.

FIG. 3 is a flowchart showing a first process example of the additionally-written-portion extraction module 120. If an image of a target document is read with a scanner and if an additionally written portion is particularly a maker image, it may become difficult to extract the additionally written portion particularly because of settings of the scanner, influence of image compression, and the like. That is, in order to suppress the case where concealment does not comply with intension of a person who makes additional writing, the process example according to the flowchart of FIG. 3 or 6 is executed.

At step S302, a first area including at least a part of an additionally written portion is extracted using a first threshold value. For example, an area having saturation that is equal to or greater than the first threshold value in an L*a*b* space is extracted. In an example shown in FIG. 4, a shaded area of "F," "#," "G," and "H" portions is the additionally written portion.

At step S304, a pixel block (may be referred to as a "character image") is clipped from the image. The pixel block contains at least a pixel area that continues in a four or eight-connectivity form. The pixel block also may contain a set of such pixel areas. The expression a "set of pixel areas" is used to mean that there are plural pixel areas each of which continues in the four-connectivity form and the plural pixel areas are close to each other. The pixel areas, which are close to each other, may be pixels areas that are separate in short distance, pixel areas obtained by projecting an image in a longitudinal or lateral direction and dividing the image at blank positions so as to clip characters from one line of sentence one character by one character, or the pixel areas obtained by clipping an image at given intervals.

One pixel block often forms an image of one character. However, it is not necessary that a pixel block is a pixel area that can be actually recognized as a character by a human being. A pixel block may be a part of a character, a pixel area not forming a character or the like, and thus may be any block of pixels.

Figure 4:
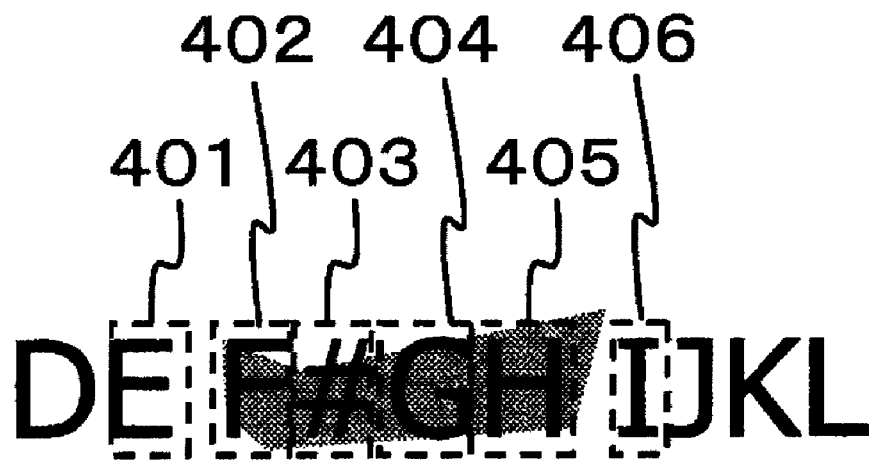
FIG. 4 is an explanatory view showing an example of an image to be processed by the additionally-written-portion extraction module.

In the example shown in FIG. 4, "D," "E," "F," "#," "G," "H," "I," "J," "K," and "L" are clipped character images.

At step S306, a target character image is determined, and a character image (may be referred to as a "peripheral character image") that exists around the target character image is determined. For example, an overlap portion where the additionally written portion extracted at step S302 overlaps with the character image clipped at step S304 is adopted as the target character image. The peripheral character image is a character image that exists within a predetermined distance from the target character image. Further, a rectangle circumscribing the additionally written portion may be obtained, and a character image existing in the longitudinal direction of the circumscribed rectangle (in the example in FIG. 4, the lateral (horizontal) direction) may be adopted as the peripheral character image. In the example in FIG. 4, 402 to 405 designate target character images, and 401 and 406 designate peripheral character images.

At step S308, a density of each peripheral character image (a ratio of black pixels of each character image to an area of a rectangle circumscribing each character image) is calculated.

At step S310, the first threshold value is changed in accordance with the density calculated at step S308, to obtain a second threshold value. More specifically, if the density is high, the second threshold value is lowered (namely, direction in which a second area including the additionally written portion can be made larger); if the density is low, the second threshold value is set to be close to the original value.

Figure 5:
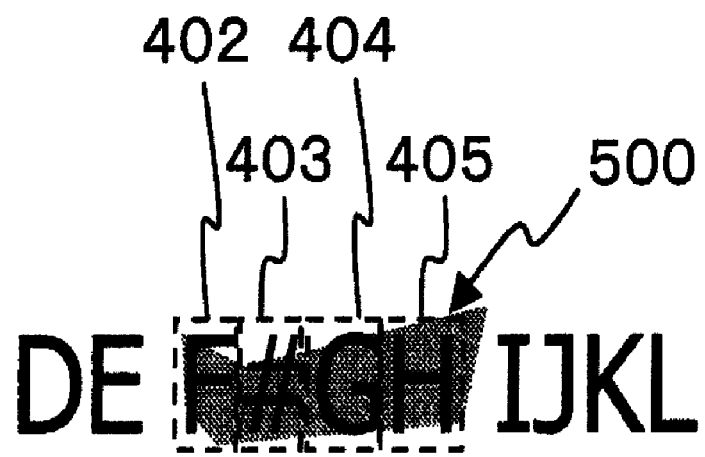
FIG. 5 is an explanatory view showing an example of the image processed by the additionally-written-portion extraction module.

At step S312, a second area including the additionally written portion is extracted from the original image using the second threshold value calculated at step S310. A process similar to that at step S302 may be performed. For example, an area having saturation that is equal to or greater than the second threshold value in an $L^*a^*b^*$ space is extracted from the original image. Alternatively, an extraction process may be performed only for the portions of the peripheral character images. For example, an area having saturation that is equal to or greater than the second threshold value in an $L^*a^*b^*$ space is extracted from the peripheral character images, and the extracted area and the first area are combined to obtain the second area. In the example in FIG. 5, a determined mask area 500 (containing the target character images 402 to 405) is shown.

FIG. 6 is a flowchart showing a second process example of the additionally-written-portion extraction module 120. For steps that are similar to the steps in the flowchart example shown in FIG. 3, such steps are clearly indicated and will not described again. Particularly, the second process example is an example that deals with the case where there is a line segment that breaks a marker image, a white portion is generated in the surrounding of the line segment due to processing such as character enhancement, and it is difficult to connect divided maker images even if postprocessing such as a process of repeating expansion and shrinkage is performed.

Step S602 is similar to step S302.

At step S604, a line direction of the original image (vertical writing or horizontal writing) is determined. For example, the whole original image is projected, and a direction in which high projection exists is the direction of the character string (the expression "high projection exists" means that there appears a peak, that there is a clear difference in level, or that there is a large difference from an average). The line direction may be determined based on an aspect ratio of the additionally written portion.

Step S606 is similar to step S304.

Step S608 is similar to step S306.

Figures 7A, 7B:
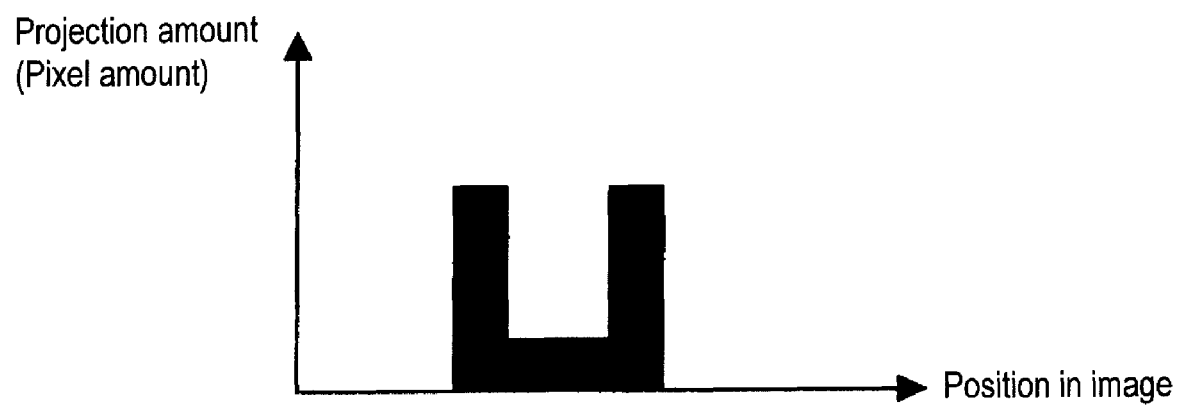
FIGS. 7A and 7B are explanatory views showing an example of a line segment amount.

At step S610, a line segment amount of the peripheral character image is extracted. Specifically, the number of line segments in the direction crossing the line direction determined at step S604 is extracted. For example, when the peripheral character image is "H" as shown in FIG. 7A, if the line direction is horizontal, the peripheral character image "H" is projected in the longitudinal direction and the fact that the number of line segments is two is extracted as shown in FIG. 7B. Alternatively, the line segment amount may be extracted by performing matching processing with a predetermined direction pattern.

At step S612, the first threshold value is changed in accordance with the line segment amount extracted at step S610 to calculate the second threshold value. More specifically, if the line segment amount is large, the threshold value is lowered (namely, direction in which the second area including the additionally written portion can be made larger); if the line segment amount is small, the second threshold value is set to be close to the original value.

Step S614 is similar to step S312.

Figure 8A:
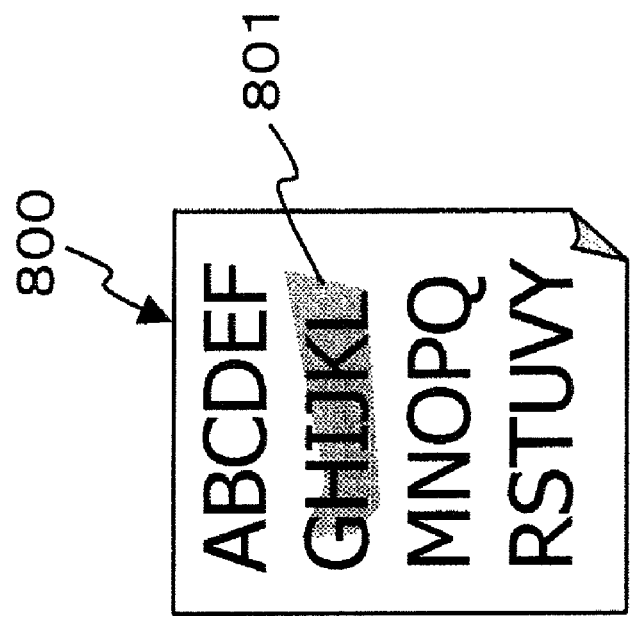
FIGS. 8A to 8C are explanatory views showing an example of an image to be processed by a mask area determination module.
Figure 8B:
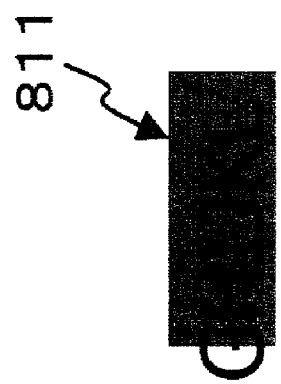
Figure 8C:
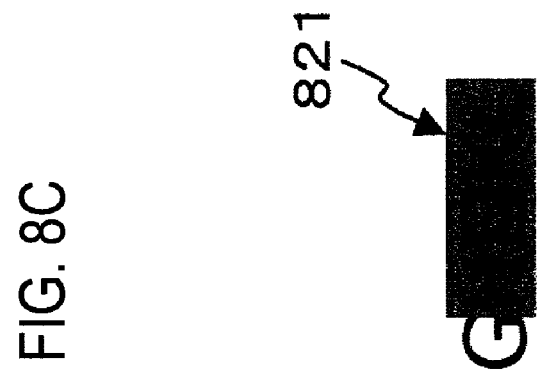

FIGS. 8A to 8C are explanatory views showing an example of an image to be processed by the mask area determination module 130.

The mask area determination module 130 performs a process of shaping the second area (the additionally written portion) extracted by the additionally-written-portion extraction module 120 to a rectangle. In this processing, it is solved that an additional written portion protrudes into a part of a character image not to be concealed and that a part of a character image is not sufficiently concealed. For example, as shown in FIG. 8A, a target image 800 contains an additionally written portion 801. When a rectangle circumscribing the additionally written portion 801 is extracted, a mask area 811 shown in FIG. 8B is obtained. The mask area 811 protrudes from the character images "H", "I", "J", "K" and "L" to be concealed, in upper, left, and right directions. Then, the mask area determination module 130 extracts a rectangle circumscribing only character images each of which is contained in a predetermined ratio (for example, 50%) or more in the mask area 811, and determines a mask area 821 as shown in FIG. 8C.

Examples of a document and a printed document to which the exemplary embodiment is applied will be discussed with FIGS. 9, 10A and 10B.

Figure 9:
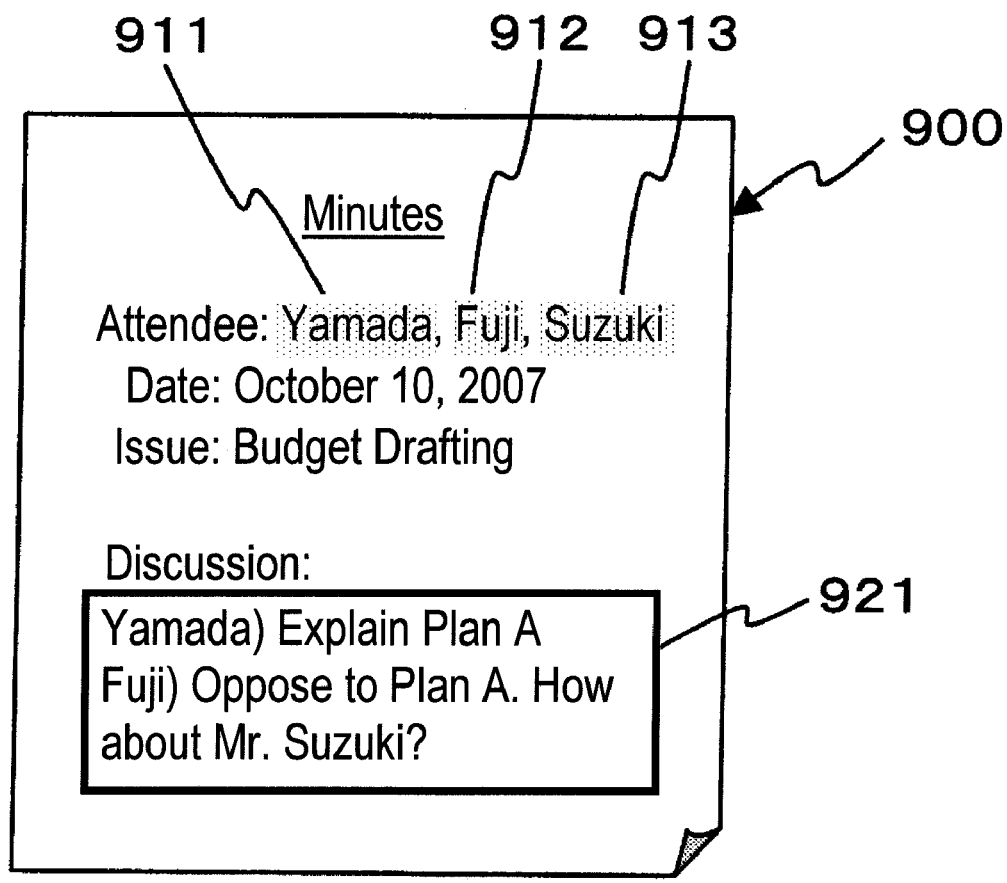
FIG. 9 is an explanatory view showing an example of an image received by an image receiving module.

FIG. 9 is an explanatory view showing an example of an image received by the image receiving module 110.

A target image 900 contains additionally written portions 911, 912, 913, and 921. The additionally written portions 911 to 913 are areas marked with a marker pen having a certain color, but the additionally written portion 921 is an area surrounded by a marker pen having a different color from the certain color of the additionally written portions 911, etc. The additionally written portions 911 to 913 covers personal information, and the additionally written portion 921 surrounds deliberation/discussion information.

Figure 10B:
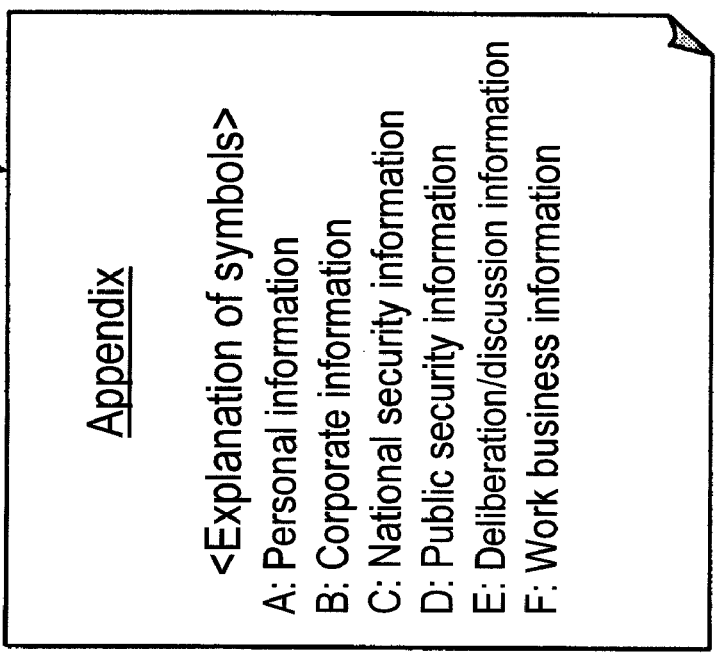
FIGS. 10A and 10B are explanatory views showing an example of a composite image provided by a combining module.
Figure 10A:
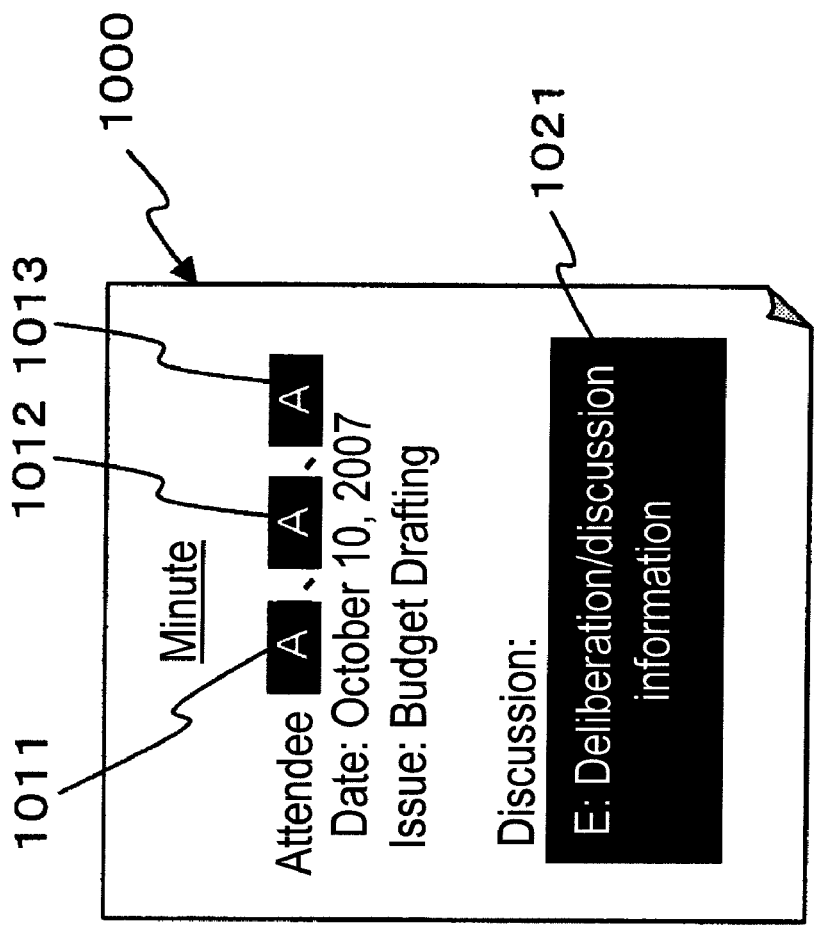

FIGS. 10A and 10B are explanatory views showing an example of a composite image provided by the combining module 170 (containing a supplemental image generated by the supplemental image generation module 160).

In response to the target image 900, an output image 1000 and an output supplemental image 1050 are printed. The output image 1000 contains mask areas 1011, 1012, 1013, and 1021. The mask areas 1011 to 1013 are images each indicating that the concealing reason is "A", and the mask area 1021 is an image indicating that the concealing reason is "E: deliberation/discussion information". The output supplemental image 1050 indicates what reason "A" and the like are. Unlike the mask area 1021, each of the mask areas 1011 to 1013 does not have a sufficient size to show the whole concealing reason. Thus, each of the mask areas 1011 to 1013 only shows a symbol, and the output supplemental image 1050 showing the meanings of the respective symbols is added. Since the output image 1000 does not have a blank area in which the image shown in the output supplemental image 1050 can be inserted, the output supplemental image 1050 is added.

The mask reason determination module 140 determines the concealing reason. For example, as shown in FIG. 9, a person who makes additionally writing uses additional writing colors properly according to the concealing reasons. The mask reason determination module 140 uses such information to determine the concealing reasons.

Figure 11:
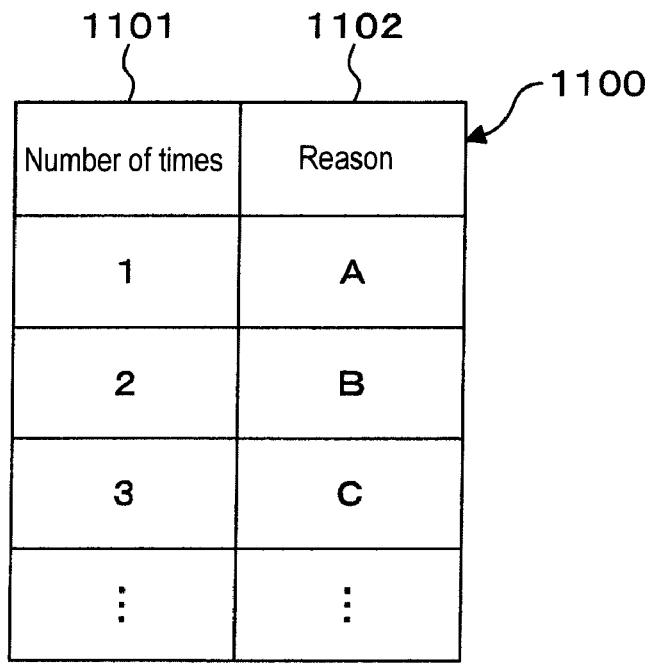
FIG. 11 is an explanatory view showing a data structure example of a number-of-time/reason correspondence table.

For example, it is assumed that plural copies of a document is prepared, that additional writing is made in one document only for one concealing reason and that additional writing is made in another of the copies only for another concealing reason. It is further assumed that thereafter, the reasons are determined according to the scanning order. For example, a document to which additional writing is made for reason A is read first, and a document to which additional writing is made for reason B is read second. In this case, the count module 141 detects the number of times the scanning is performed, and determines the reason using a number-of-time/reason correspondence table 1100. FIG. 11 is an explanatory view showing a data structure example of the number-of-time/reason correspondence table 1100. The number-of-time/reason correspondence table 1100 has a number-of-time column 1101 and a reason column 1102. When using this exemplary embodiment, a manipulator may specify a concealing reason.

Figure 12:
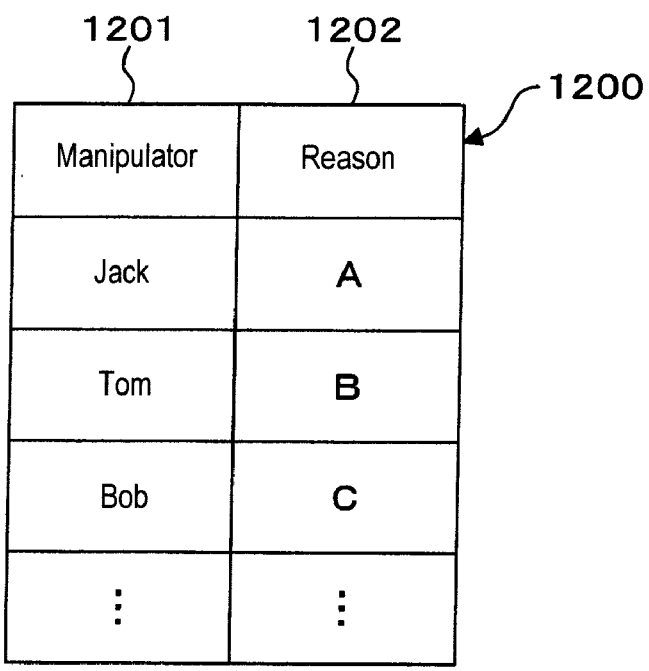
FIG. 12 is an explanatory view showing a data structure example of an manipulator/reason correspondence table.

As another example, each manipulator may be in charge of a corresponding concealing reason. For example, Jack is in charge of reason A. In such a case, the manipulator detection module 142 detects a manipulator and determines a reason using a manipulator/reason correspondence table 1200. FIG. 12 is an explanatory view showing a data structure example of the manipulator/reason correspondence table 1200. The manipulator/reason correspondence table 1200 has a manipulator column 1201 and a reason column 1202.

Figure 13:
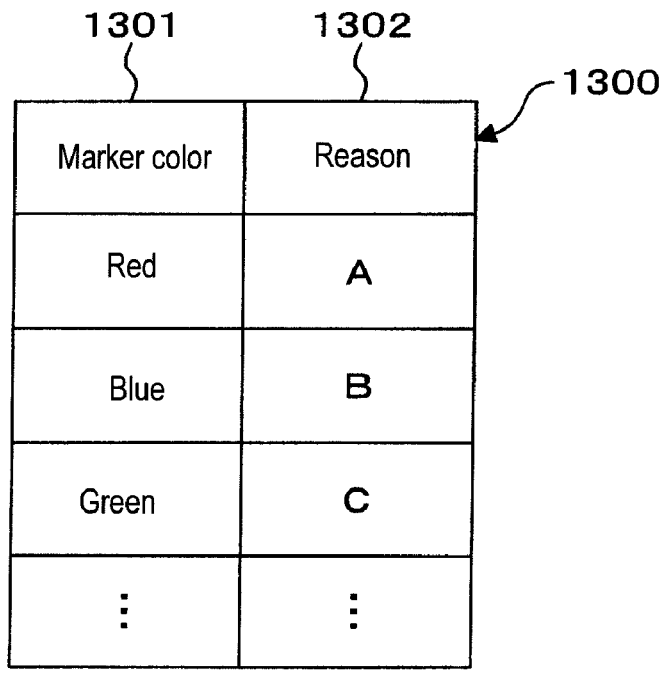
FIG. 13 is an explanatory view showing a data structure example of a marker color/reason correspondence table.

As further another example, each concealing reason may be associated with a corresponding marker color of additional writing. For example, red is associated with a reason A. In such a case, the feature extraction module 143 extracts a color of the additionally written portion and determines a reason using a marker color/reason correspondence table 1300. FIG. 13 is an explanatory view showing a data structure example of the marker color/reason correspondence table 1300. The marker color/reason correspondence table 1300 has a marker color column 1301 and a reason column 1302. In addition to or in place of the marker color, a line width, a line type, a size, etc., of the additional write may be used. Particularly, in order to increase the number of compatible reasons, it is better to use another feature in combination rather than using colors that are different but similar to each other.

Figure 14:
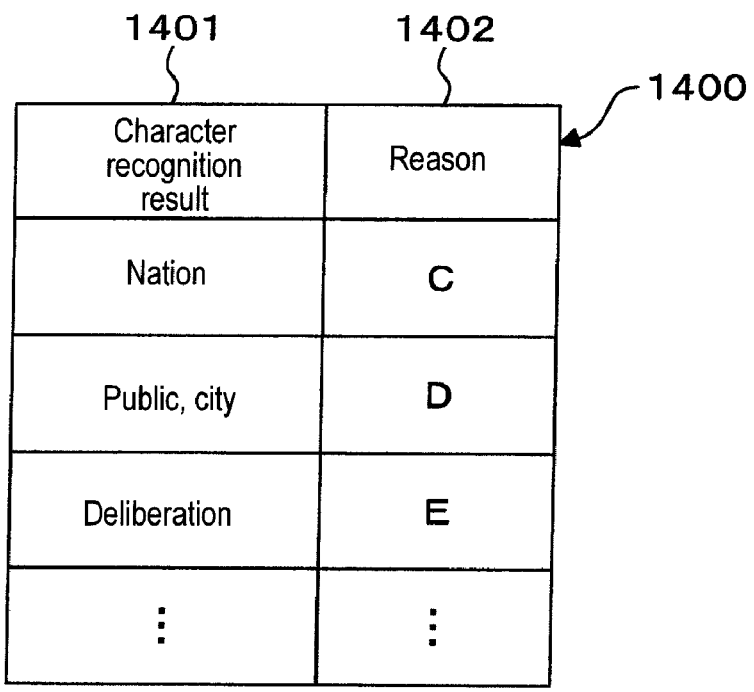
FIG. 14 is an explanatory view showing a data structure example of a character recognition result/reason correspondence table.

As still another example, characters in a mask area may be recognized independently of administration. For example, if a character string of "nation" or the like is contained, the concealing reason is a reason C. In such a case, the character recognition module 144 performs the character recognition process for the mask area and determines a reason using a character recognition result/reason correspondence table 1400. FIG. 14 is an explanatory view showing a data structure example of the character recognition result/reason correspondence table 1400. The character recognition result/reason correspondence table 1400 has a character recognition result column 1401 and a reason column 1402.

Figure 15:
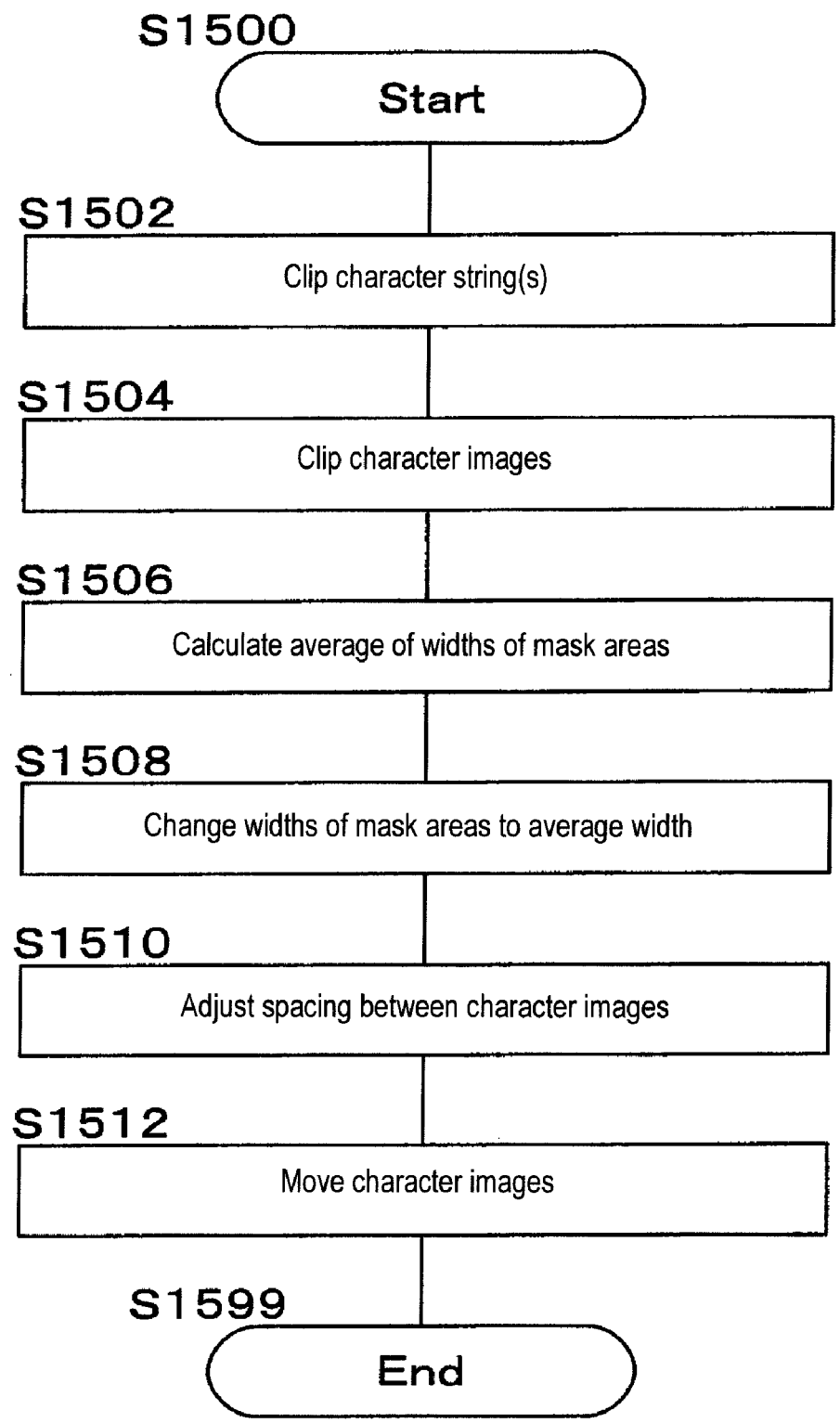
FIG. 15 is a flowchart showing a process example of a mask area conversion module and the combining module.

FIG. 15 is a flowchart showing a process example of the mask area conversion module 150 and the combining module 170. There may be a case that concealed characters is able to be inferred based on a size of a mask area (particularly, a name, etc., may be easily inferred). This processing is performed to deal with such a situation.

At step S1502, the mask area conversion module 150 clips a character string from the original image. Similar processing to that at step S604 shown in the example in FIG. 6 may be performed or the result of step S604 may be used. In an example in FIG. 16A, three character strings are clipped from a target image 1600.

At step S1504, the mask area conversion module 150 clips character images from a character string where a mask area exists. Similar processing to that at step S304 shown in the example in FIG. 3 may be performed or the result of step S304 may be used. In the example in FIG. 16A, character images are clipped from first and second character strings where mask areas 1611 and 1612 exist. That is, character images of "A" to "J" are clipped from the first character string, and character images "K" to "S" are clipped from the second character string.

At step S1506, the mask area conversion module 150 measures a width of each mask area and calculates an average value of the widths. In the example in FIG. 16A, the mask area conversion module 150 measures a width of the mask area 1611 (three characters) and a width of the mask area 1612 (two characters), and calculates an average value of the widths.

At step S1508, the mask area conversion module 150 converts the width of each mask area into the average value calculated at step S1506. That is, the mask area conversion module 150 makes the sizes of the mask areas become the same. In the example in FIGS. 16A and 16B, the mask area 1611 is converted into a mask area 1661, and the mask area 1612 is converted into a mask area 1662. The mask areas 1661 and 1662 have the same width.

At step S1510, the combining module 170 adjusts spacing between the character images outside the mask area so as to become a character string having a length equal to the character string of the original image. In an example in FIG. 16B, the spacing between the character images in the first character string is lengthened, and the spacing between the character images of the second character string is shortened. Accordingly, the length of each character string in an output image 1650 is not changed from that in the original image.

At step S1512, the combining module 170 moves the character images in accordance with the spacing adjusted at step S1510.

Here, the average value of the widths of the mask areas is calculated. However, a minimum value of the widths of the mask areas, the maximum value of the widths of the mask areas or the like may be used. Mask area conversion is performed for all mask areas, but may be performed for each character string.

Figure 17:
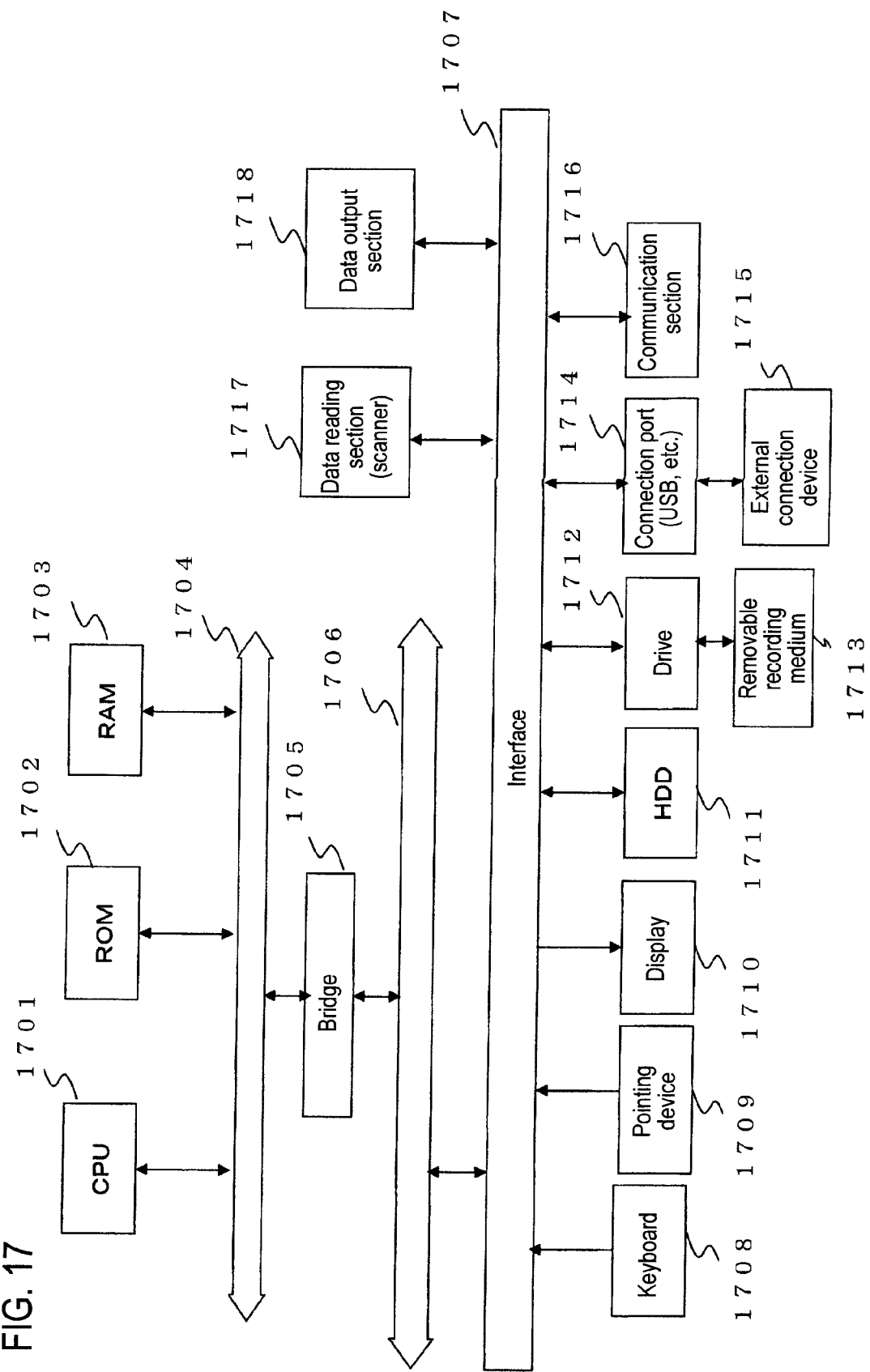
FIG. 17 is a block diagram showing a hardware configuration example of a computer for implementing the exemplary embodiment of the invention.

A hardware configuration example of the exemplary embodiment of the invention will be discussed with reference to FIG. 17. The configuration shown in FIG. 17 is made up of a personal computer (PC), etc., for example, and shows a hardware configuration example including a data reading section 1717 such as a scanner and a data output section 1718 such as a printer.

A CPU (Central Processing Unit) 1701 is a control section for executing processing in accordance with a computer program describing the execution sequences of the various modules described above in the exemplary embodiment, namely, the additionally-written-portion extraction module 120, the mask area determination module 130, the mask reason determination module 140, the mask area conversion module 150, the supplemental image generation module 160, the combining module 170, etc.

ROM (Read-Only Memory) 1702 stores programs, operation parameters, etc., used by the CPU 1701. RAM (Random Access Memory) 1703 stores programs used in execution of the CPU 1701, parameters changing appropriately in the execution of the CPU 1701, and the like. They are connected by a host bus 1704 implemented as a CPU bus, etc.

The host bus 1704 is connected to an external bus 1706 such as a PCI (Peripheral Component Interconnect/Interface) bus through a bridge 1705.

A keyboard 1708 and a pointing device 1709 such as a mouse are input devices operated by the manipulator. A display 1710 is implemented as a liquid crystal display, a CRT (Cathode Ray Tube), or the like for displaying various pieces of information as text and image information.

An HDD (Hard Disk Drive) 1711 contains a hard disk and drives the hard disk for recording or playing back a program and information executed by the CPU 1701. The images received by the image receiving module 110, the composite images provided by the combining module 170, etc., are stored on the hard disk. Further, various computer programs, such as various data processing programs, are stored on the hard disk.

A drive 1712 reads data or a program recorded on a mounted removable recording medium 1713 such as a magnetic disk, an optical disk, a magneto-optical disk, or semiconductor memory, and supplies the data or the program to the RAM 1703 connected through the interface 1707, the external bus 1706, the bridge 1705, and the host bus 1704. The removable recording medium 1713 can also be used as a data record area like a hard disk.

A connection port 1714 is a port for connecting an external connection device 1715 and has a connection section of a USB, IEEE 1394, etc. The connection port 1714 is connected to the CPU 1701, etc., through the interface 1707, the external bus 1706, the bridge 1705, the host bus 1704, etc. A communication section 1716 is connected to a network for executing data communication processing with an external system. A data reading section 1717 is a scanner, for example, and executes document read processing. A data output section 1718 is a printer, for example, and executes document data output processing.

The hardware configuration shown in FIG. 17 shows one configuration example and the exemplary embodiment of the invention is not limited to the configuration shown in FIG. 17 and may be any if it makes it possible to execute the modules described in the exemplary embodiment. For example, some modules may be implemented as dedicated hardware (for example, an application-specific integrated circuit (ASIC), etc.) and some modules may be included in an external system and may be connected via a communication line and further a plurality of systems shown in FIG. 17 may be connected via a communication line so as to operate in cooperation with each other. The hardware configuration (embodiment) may be built in a copier, a fax, a scanner, a printer, a multiple function device (an image processing apparatus having the functions of any two or more of a scanner, a printer, a copier, a fax, etc.), etc.

In the exemplary embodiment described above, images of a document of horizontal writing are illustrated, but the exemplary embodiment may be applied to a document of vertical writing. Character images are illustrated as the target to be concealed, but may be any other image (pattern, photo, etc.).

The described program may be provided as it is stored on a recording medium or the program may be provided through communication line. In this case, for example, the described program may be grasped as the invention of a computer-readable recording medium recording a program."

The expression "computer-readable recording medium recording a program" is used to mean a recording medium read by a computer recording a program, used to install and execute a program, to distribute a program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), blue-ray disk, magneto-optical disk (MO), flexible disk (FD), magnetic tape, hard disk, read-only memory (ROM), electrically erasable and programmable read-only memory (EEPROM), flash memory, random access memory (RAM), etc., for example.

The described program or a part thereof may be recorded in any of the described record media for retention, distribution, etc. The described program or a part thereof may be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and may be carried over a carrier wave.

Further, the described program may be a part of another program or may be recorded in a recording medium together with a different program. It may be recorded as it is divided into a plurality of record media. It may be recorded in any mode if it can be restored, such as compression or encryption.

The exemplary embodiment can also be grasped as having the following configuration, which may be combined with the mask area conversion module 150:

(A1) An image processing apparatus including:
 an image receiving unit that receives an image;
 an additionally written portion extraction unit that extracts a portion having been additionally written in the image received by the image receiving unit;
 a concealment area determination unit that determines an area to be concealed in the image based on the additionally written portion extracted by the additionally written portion extraction unit;
 a concealing reason determination unit that determines a concealing reason based on information concerning manipulation of the image or a feature concerning the additionally written portion extracted by the additionally written portion extraction unit;
 an image concealing unit that conceals the area determined by the concealment area determination unit in the image; and
 an image addition unit that adds information concerning the concealing reason determined by the concealing reason determination unit to the image.

(A2) The image processing apparatus described in (A1), wherein the concealing reason determination unit uses information responsive to manipulation of a manipulator or information the identifies the manipulator, as the information concerning manipulation of the image.

(A3) The image processing apparatus described in (A1) or (A2), wherein the concealing reason determination unit uses a form of the additionally written portion or a result of a character recognition process performed for the concealment area determined by the concealment area determination unit in combination, in addition to color information of the additionally written portion as the feature concerning the additionally written portion.

(A4) The image processing apparatus described in any one of (A1) to (A3), wherein the image addition unit adds an image showing information concerning the reason in response to a size of a blank area in the image.

(A5) The image processing apparatus described in any one of (A1) to (A4), wherein the image addition unit includes information that identifies a person who has concealed in the information concerning the reason.

(A6) An image processing program for causing a computer to function as:
 an image receiving unit that receives an image;
 an additionally written portion extraction unit that extracts a portion having been additionally written in the image received by the image receiving unit;
 a concealment area determination unit that determines an area to be concealed in the image based on the additionally written portion extracted by the additionally written portion extraction unit;

a concealing reason determination unit that determines a concealing reason based on information concerning manipulation of the image or a feature concerning the additionally written portion extracted by the additionally written portion extraction unit;

an image concealing unit that conceals the area determined by the concealment area determination unit in the image; and an image addition unit that adds information concerning the concealing reason determined by the concealing reason determination unit to the image.

(C1) An image processing apparatus including:

an image receiving unit that receives an image;

a first extraction unit that extracts, using a first threshold value, a first area including at least a part of a portion having been additionally written in the image received by the image receiving unit;

a threshold value calculation unit that calculates a second threshold value based on a feature in a third area that is arranged along with the first area extracted by the first extraction unit;

a second extraction unit that extracts, using the second threshold value calculated by the threshold value calculation unit, a second area including the portion having been additionally written in the image received by the image receiving unit;

a concealment area determination unit that determines an area to be concealed in the image, based on the second area extracted by the second extraction unit; and an image concealing unit that conceals the area, determined by the concealment area determination unit, in the image.

(C2) The image processing apparatus described in (C1), wherein the threshold value calculation unit uses a pixel density in the third area as the feature in the third area.

(C3) The image processing apparatus described in (C1), wherein the threshold value calculation unit uses a line segment amount in the third area as the feature in the third area.

(C4) The image processing apparatus described in (C3), wherein the line segment amount used by the threshold value calculation unit is a number of line segments in the third area that extend in substantially parallel to a short side of the first area.

(C5) The image processing apparatus described in (C1), wherein the threshold value calculation unit uses a pixel density and a line segment amount in the third area as the feature in the third area.

(C6) The image processing apparatus described in (C5), wherein the line segment amount used by the threshold value calculation unit is a number of line segments in the third area that extend in substantially parallel to a short side of the first area.

(C7) The image processing apparatus according to any of (C1) to (C6), wherein the second threshold value calculated by the threshold value calculation unit is a value that can be used to extract a larger area than the first area, which is extracted using the first threshold value, and the second extraction unit performs a certain process for the third area using the second threshold value to extract the second area.

(C8) An image processing method including:

receiving an image;

extracting, using a first threshold value, a first area including at least a part of a portion having been additionally written in the received image;

calculating a second threshold value based on a feature in a third area that is arranged along with the extracted first area;

extracting, using the calculated second threshold value, a second area including the portion having been additionally written in the received image;

determining an area to be concealed in the image, based on the extracted second area; and concealing the determined area in the image.

(C9) A computer-readable medium storing a program that causes a computer to execute image processing, the image processing including:

receiving an image;

extracting, using a first threshold value, a first area including at least a part of a portion having been additionally written in the received image;

calculating a second threshold value based on a feature in a third area that is arranged along with the extracted first area;

extracting, using the calculated second threshold value, a second area including the portion having been additionally written in the received image;

determining an area to be concealed in the image, based on the extracted second area; and concealing the determined area in the image.

What is claimed is:

1. An image processing apparatus comprising:
an image receiving unit that receives an image;
an extraction unit that extracts a portion having been additionally written in the image received by the image receiving unit;
a determination unit that determines a plurality of areas to be concealed in the received image based on the additionally written portion extracted by the extraction unit;
an area conversion unit that reads out sizes of the plurality of areas determined by the determination unit and that converts the plurality of areas determined by the determination unit; and
an image concealing unit that (i) determines sizes of concealing images based on the sizes of the plurality of areas read out by the area conversion unit, (ii) generates the concealing images in the determined sizes and (iii) conceals the plurality of areas determined by the determination unit in the received image using the generated concealing images, each of which has a same size,
wherein:
the area conversion unit converts a size of each of the plurality of determined areas based on the sizes of the plurality of determined areas,
the area conversion unit calculates an average size of the plurality of the determined areas, and
the image concealing unit generates the concealing images in the average size calculated by the area conversion unit and conceals the plurality of determined areas using the generated concealing images.

2. The image processing apparatus according to claim 1, wherein the image concealing unit converts a second area of the image received by the image receiving unit,
wherein the second area is different from the plurality of areas determined by the determination unit.

3. The image processing apparatus according to claim 2, wherein the image concealing unit converts the second area by adjusting spacing between character images within the second area so as to keep a length of each character string in the image received by the image receiving unit.

4. The image processing apparatus according to claim 1, wherein:
the determination unit determines the plurality of areas for respective character strings, and
the concealing images each have the same size for each respective character string.

5. The image processing apparatus according to claim 1, wherein the sizes of the plurality of determined areas include widths of the plurality of the determined areas.

6. An image processing apparatus comprising:
an image receiving unit that receives an image;
an extraction unit that extracts a portion having been additionally written in the image received by the image receiving unit;
a determination unit that determines a plurality of areas to be concealed in the received image based on the additionally written portion extracted by the extraction unit;
an area conversion unit that reads out sizes of the plurality of areas determined by the determination unit and that converts the plurality of areas determined by the determination unit; and
an image concealing unit that (i) determines sizes of concealing images based on the sizes of the plurality of areas read out by the area conversion unit, (ii) generates the concealing images in the determined sizes and (iii) conceals the plurality of areas determined by the determination unit in the received image using the generated concealing images, each of which has a same size, wherein:
the area conversion unit converts a size of each of the plurality of determined areas based on the sizes of the plurality of determined areas, and
the area conversion unit converts the plurality of determined areas by adjusting the size of each of the plurality of the determined areas based on a number of characters in the respective one of
the plurality of determined areas.

7. The image processing apparatus according to claim 6, wherein the image concealing unit converts a second area of the image received by the image receiving unit,
wherein the second area is different from the plurality of areas determined by the determination unit.

8. The image processing apparatus according to claim 7, wherein the image concealing unit converts the second area by adjusting spacing between character images within the second area so as to keep a length of each character string in the image received by the image receiving unit.

9. The image processing apparatus according to claim 6, wherein the area conversion unit converts the plurality of determined areas by adjusting the size of each of the plurality of determined areas based on a number of characters in the plurality of determined areas.

10. An image processing apparatus comprising:
an image receiving unit that receives an image;
an extraction unit that extracts a portion having been additionally written in the image received by the image receiving unit;
a determination unit that determines a plurality of areas to be concealed in the received image based on the additionally written portion extracted by the extraction unit;
an area conversion unit that reads out sizes of the plurality of areas determined by the determination unit and that converts the plurality of areas determined by the determination unit; and
an image concealing unit that (i) determines sizes of concealing images based on the sizes of the plurality of areas read out by the area conversion unit, (ii) generates the concealing images in the determined sizes and (iii) conceals the plurality of areas determined by the determination unit in the received image using the generated concealing images, each of which has a same size, wherein:
the determination unit determines the plurality of areas for respective character strings, and
the concealing images each have the same size for each respective character string.

11. An image processing apparatus comprising:
an image receiving unit that receives an image;
an extraction unit that extracts a portion having been additionally written in the image received by the image receiving unit;
a determination unit that determines a plurality of areas to be concealed in the received image based on the additionally written portion extracted by the extraction unit;
an area conversion unit that reads out sizes of the plurality of areas determined by the determination unit and that converts the plurality of areas determined by the determination unit; and
an image concealing unit that (i) determines sizes of concealing images based on the sizes of the plurality of areas read out by the area conversion unit, (ii) generates the concealing images in the determined sizes and (iii) conceals the plurality of areas determined by the determination unit in the received image using the generated concealing images, each of which has a same size,
wherein the sizes of the plurality of determined areas include widths of the plurality of the determined areas.

12. An image processing method comprising:
receiving an image;
extracting a portion having been additionally written in the received image;
determining a plurality of areas to be concealed in the received image based on the extracted portion;
reading out sizes of the plurality of areas determined;
converting the plurality of areas determined;
determining sizes of concealing images based on the sizes of the plurality of areas read out;
generating the concealing images in the determined sizes; and
concealing the plurality of areas determined in the received image using the generated concealing images, each of which has a same size,
wherein the converting comprises:
converting a size of each of the plurality of areas determined based on the sizes of the plurality of areas determined; and
calculating an average size of the plurality of the areas determined, wherein the generating comprises generating the concealing images in the average size calculated, and
wherein the concealing comprises concealing the plurality of areas determined using the generated concealing images.

13. An image processing method comprising:
receiving an image;
extracting a portion having been additionally written in the received image;
determining a plurality of areas to be concealed in the received image based on the extracted portion;
reading out sizes of the plurality of areas determined;
converting the plurality of areas determined;
determining sizes of concealing images based on the sizes of the plurality of areas read out;
generating the concealing images in the determined sizes; and
concealing the plurality of areas determined in the received image using the generated concealing images, each of which has a same size,
wherein the converting comprises:

converting a size of each of the plurality of areas determined based on the sizes of the plurality of areas determined; and converting the plurality of areas determined by adjusting the size of each of the plurality of the areas determined based on a number of characters in the respective one of the plurality of areas determined.

14. An image processing method comprising:
receiving an image;
extracting a portion having been additionally written in the received image;
determining a plurality of areas to be concealed in the received image based on the extracted portion;
reading out sizes of the plurality of areas determined;
converting the plurality of areas determined;
determining sizes of concealing images based on the sizes of the plurality of areas read out;
generating the concealing images in the determined sizes; and
concealing the plurality of areas determined in the received image using the generated concealing images, each of which has a same size,
wherein:
the determining the plurality of areas comprises determining the plurality of areas for respective character strings, and
the concealing images each have the same size for each respective character string.

15. An image processing method comprising:
receiving an image;
extracting a portion having been additionally written in the received image;
determining a plurality of areas to be concealed in the received image based on the extracted portion;
reading out sizes of the plurality of areas determined;
converting the plurality of areas determined;
determining sizes of concealing images based on the sizes of the plurality of areas read out;
generating the concealing images in the determined sizes; and
concealing the plurality of areas determined in the received image using the generated concealing images, each of which has a same size,
wherein the sizes of the plurality of areas determined include widths of the plurality of the areas determined.

16. A non-transitory computer-readable medium storing a program that causes a computer to execute image processing, the image processing comprising:
receiving an image;
extracting a portion having been additionally written in the received image;
determining a plurality of areas to be concealed in the received image based on the extracted portion;
reading out sizes of the plurality of areas determined;
converting the plurality of areas determined;
determining sizes of concealing images based on the sizes of the plurality of areas read out;
generating the concealing images in the determined sizes; and
concealing the plurality of areas determined in the received image using the generated concealing images, each of which has a same size,
wherein the converting comprises:
converting a size of each of the plurality of areas determined based on the sizes of the plurality of areas determined; and
calculating an average size of the plurality of the areas determined,
wherein the generating comprises generating the concealing images in the average size calculated, and
wherein the concealing comprises concealing the plurality of areas determined using the generated concealing images.

17. A non-transitory computer-readable medium storing a program that causes a computer to execute image processing, the image processing comprising:
receiving an image;
extracting a portion having been additionally written in the received image;
determining a plurality of areas to be concealed in the received image based on the extracted portion;
reading out sizes of the plurality of areas determined;
converting the plurality of areas determined;
determining sizes of concealing images based on the sizes of the plurality of areas read out;
generating the concealing images in the determined sizes; and
concealing the plurality of areas determined in the received image using the generated concealing images, each of which has a same size,
wherein the converting comprises:
converting a size of each of the plurality of areas determined based on the sizes of the plurality of areas determined; and
converting the plurality of areas determined by adjusting the size of each of the plurality of the areas determined based on a number of characters in the respective one of the plurality of areas determined.

18. A non-transitory computer-readable medium storing a program that causes a computer to execute image processing, the image processing comprising:
receiving an image;
extracting a portion having been additionally written in the received image;
determining a plurality of areas to be concealed in the received image based on the extracted portion;
reading out sizes of the plurality of areas determined;
converting the plurality of areas determined;
determining sizes of concealing images based on the sizes of the plurality of areas read out;
generating the concealing images in the determined sizes; and
concealing the plurality of areas determined in the received image using the generated concealing images, each of which has a same size
wherein:
the determining the plurality of areas comprises determining the plurality of areas for respective character strings, and
the concealing images each have the same size for each respective character string.

19. A non-transitory computer-readable medium storing a program that causes a computer to execute image processing, the image processing comprising:
receiving an image;
extracting a portion having been additionally written in the received image;
determining a plurality of areas to be concealed in the received image based on the extracted portion;
reading out sizes of the plurality of areas determined;
converting the plurality of areas determined;
determining sizes of concealing images based on the sizes of the plurality of areas read out;

generating the concealing images in the determined sizes; and concealing the plurality of areas determined in the received image using the generated concealing images, each of which has a same size, wherein the sizes of the plurality of areas determined include widths of the plurality of the areas determined.

20. An image processing apparatus comprising:

an image receiving unit that receives an image;

an extraction unit that extracts a portion having been additionally written in the image received by the image receiving unit;

a determination unit that determines a plurality of areas to be concealed in the received image based on the additionally written portion extracted by the extraction unit;

an area conversion unit that reads out sizes of the plurality of areas determined by the determination unit and that converts the plurality of areas determined by the determination unit; and an image concealing unit that (i) determines sizes of concealing images based on the sizes of the plurality of areas read out by the area conversion unit, (ii) generates the concealing images in the determined sizes and (iii) conceals the plurality of areas determined by the determination unit in the received image using the generated concealing images, each of which has a same size, wherein:

the image concealing unit determines a largest size or a smallest size, among the sizes of the plurality of areas read out by the area conversion unit, to be the sizes of the concealing images, and the image concealing unit generates the concealing images in the determined largest size or smallest size, respectively.

* * * * *